Figure 1:
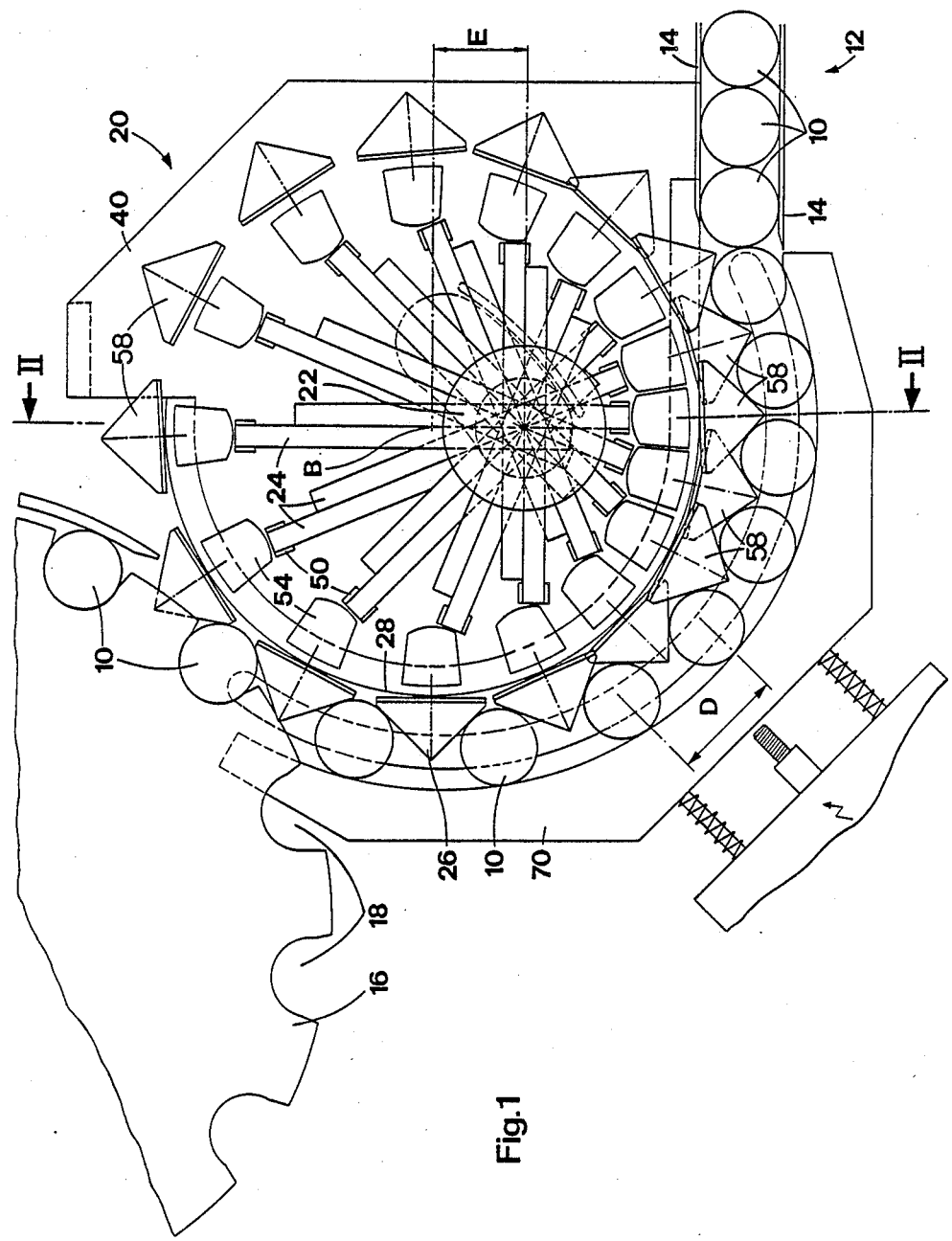

United States Patent [19]

Bogatzki

[11] Patent Number: 4,938,341
[45] Date of Patent: Jul. 3, 1990

[54] APPARATUS FOR ALTERING THE DISTANCES BETWEEN ARTICLES MOVED ONE BEHIND THE OTHER

[75] Inventor: Hans U. Bogatzki, Zurich, Switzerland

[73] Assignee: Elpatronic AG, Zug, Switzerland

[21] Appl. No.: 293,641

[22] Filed: Jan. 5, 1989

[30] Foreign Application Priority Data

Feb. 2, 1988 [CH] Switzerland .................. 00351/88

[51] Int. Cl.⁵ .............................................. B65G 37/00
[52] U.S. Cl. ............................. 198/474.1; 198/480.1
[58] Field of Search ............ 198/474.1, 461, 477.1, 198/480.1, 481.1, 476.1

[56] References Cited

U.S. PATENT DOCUMENTS

| | | | |
|---|---|---|---|
| 1,581,201 | 4/1926 | Guenther | 198/474.1 X |
| 1,828,624 | 10/1931 | Sedwick | 198/474.1 X |
| 1,985,897 | 1/1935 | Huntar | 198/474.1 X |
| 2,007,981 | 7/1935 | Nordquist | 198/471.1 X |
| 2,155,088 | 4/1939 | Hopkins | 198/474.1 X |
| 2,292,400 | 8/1942 | Nordquist | 198/474.1 X |
| 2,345,870 | 4/1944 | Guenther | 198/474.1 X |
| 2,570,198 | 10/1951 | Brager | 198/476.1 X |
| 3,869,041 | 3/1975 | Loveland | 198/481.1 X |
| 4,059,186 | 11/1977 | Ashberger et al. | 198/480.1 X |
| 4,511,027 | 4/1985 | Zamboni | 198/476.1 X |

FOREIGN PATENT DOCUMENTS 3245908 6/1984 Fed. Rep. of Germany .

Primary Examiner—Robert J. Spar
Assistant Examiner—Cheryl L. Gastineau
Attorney, Agent, or Firm—McCormick, Paulding & Huber

[57] ABSTRACT

A plurality of spokes (24) project at certain angular distances apart away from a hub (22) which can be driven in rotation about an axis of rotation (A). Disposed at one end of each of the spokes (24) is an entrainer (26), each of which is adapted to entrain one article (10) at a time. The radial distance of the entrainer (26) from the hub (22) can be varied periodically by a guide (28) during the rotation of the hub. In the course of this, the distances of the entrainer (26) apart from one another vary accordingly.

10 Claims, 5 Drawing Sheets

APPARATUS FOR ALTERING THE DISTANCES BETWEEN ARTICLES MOVED ONE BEHIND THE OTHER

The invention relates to an apparatus for altering the distances between articles moved one behind the other, particularly containers. Such apparatus is needed if like articles in the same conveying position, for example upright bottles or can bodies, which are being conveyed following close behind one another, are to be subjected individually to a testing or processing operation.

An apparatus for the automatic examination of bottles for contamination is known from DE 3245908 A1, wherein the bottles are supplied to a worm conveyor arranged horizontally and are caught by its worm threads as a result of which they are separated and conveyed further at preset distances apart. Behind the worm conveyor there is disposed a disc which is rotatable about a vertical axis and comprises arcuate recesses adapted to the contour of the bottles at its outer edge and which can be driven at a speed of rotation adapted to the speed of rotation of the worm conveyor in such a manner that each bottle released from the worm conveyor enters one of the recesses and is conveyed further, in this, over an arcuate conveying path to a rotary table. The rotary table comprises circular recesses, each for one bottle, and travels through a plurality of examination stations in which the bottles are examined optoelectronically for contamination.

Worm conveyors of the kind described only work satisfactorily as apparatus for separating articles under certain conditions. Thus the formation of the gaps between the individual threads of the worm conveyor must be closely adapted to the cross-sectional shape of the articles. The thread pitch determines once and for all the distances apart at which the articles are released by the worm conveyor. For articles with different cross-sectional shapes and dimensions, another worm conveyor is necessary in each case. The same also applies when the distances apart, at which the articles are released by the worm conveyor, have to be altered. It is also a disadvantage that the worm conveyor can only contact each article conveyed thereby linearly, not over an area, and that sliding relative movements between worm conveyor and article continuously take place at the contact line. Consequently, the surface of the articles can be dammaged; at least with high conveying speeds and correspondingly high acceleration at the beginning of the action of the worm conveyor on the articles, there is also the risk of the articles falling over if they have a small base in proportion to their height.

It is therefore the object of the invention to provide an apparatus of the kind mentioned at the beginning which can easily be adapted to articles of different shapes and dimensions and can be adjusted for different distances to be established between the articles and which is capable, in the various settings, of working in an operationally reliable manner with a high conveying speed.

According to the invention, the problem is solved by an apparatus for altering the distances between articles moved one behind the other, particularly containers, having
a hub which can be driven in rotation about an axis of rotation,
a plurality of spokes which project away from the hub at specific angular distances apart,
entrainment means which are arranged one on each spoke and are each adapted to entrain one article, and
a guide for periodically altering the radial distance of the entrainment means from the hub during the rotation.

Advantageous developments of the invention are subjects of the sub-claims.

Examples of embodiment of the invention are explained with further details below with reference to diagrammatic drawings.

Figure 2:
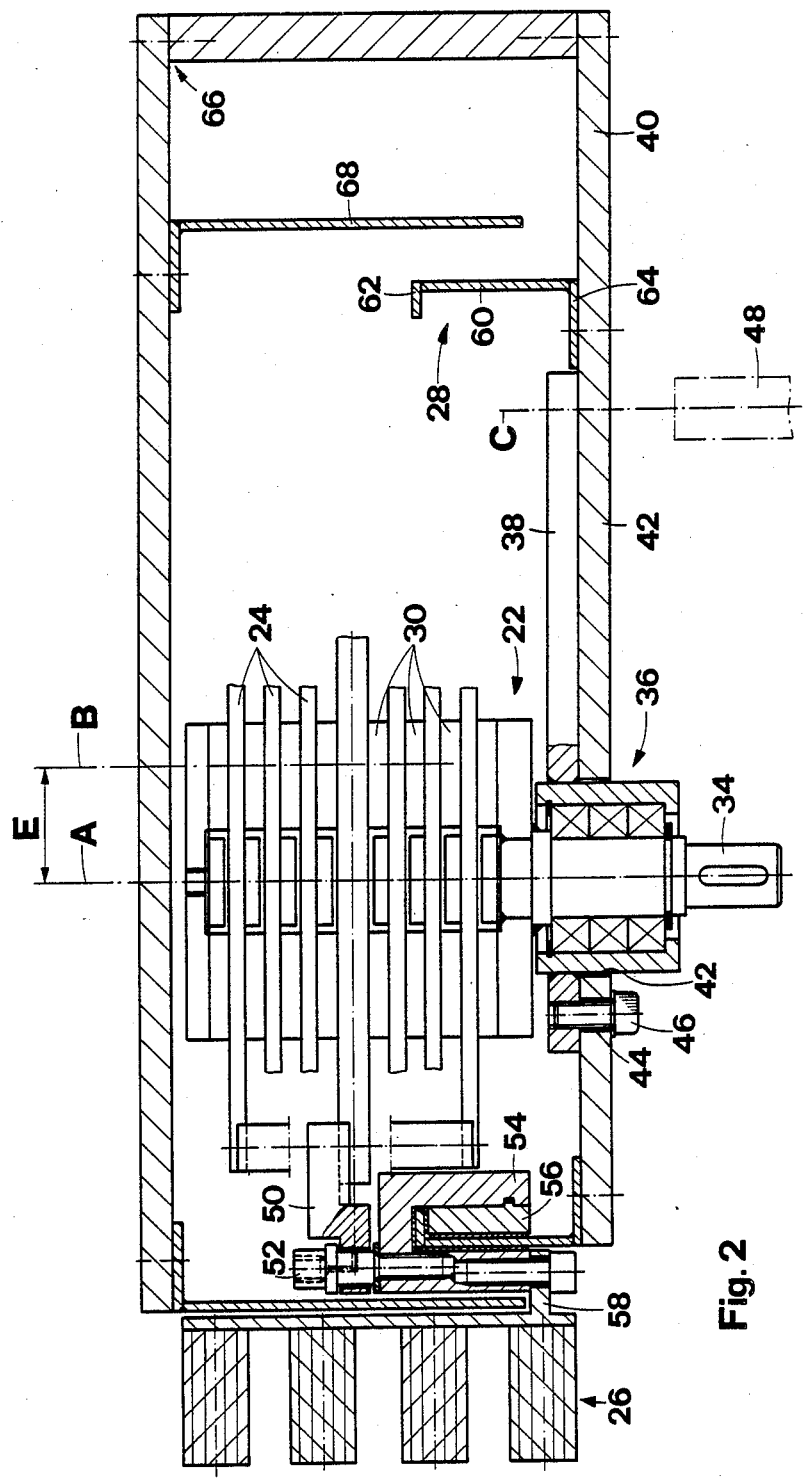
Figure 3:
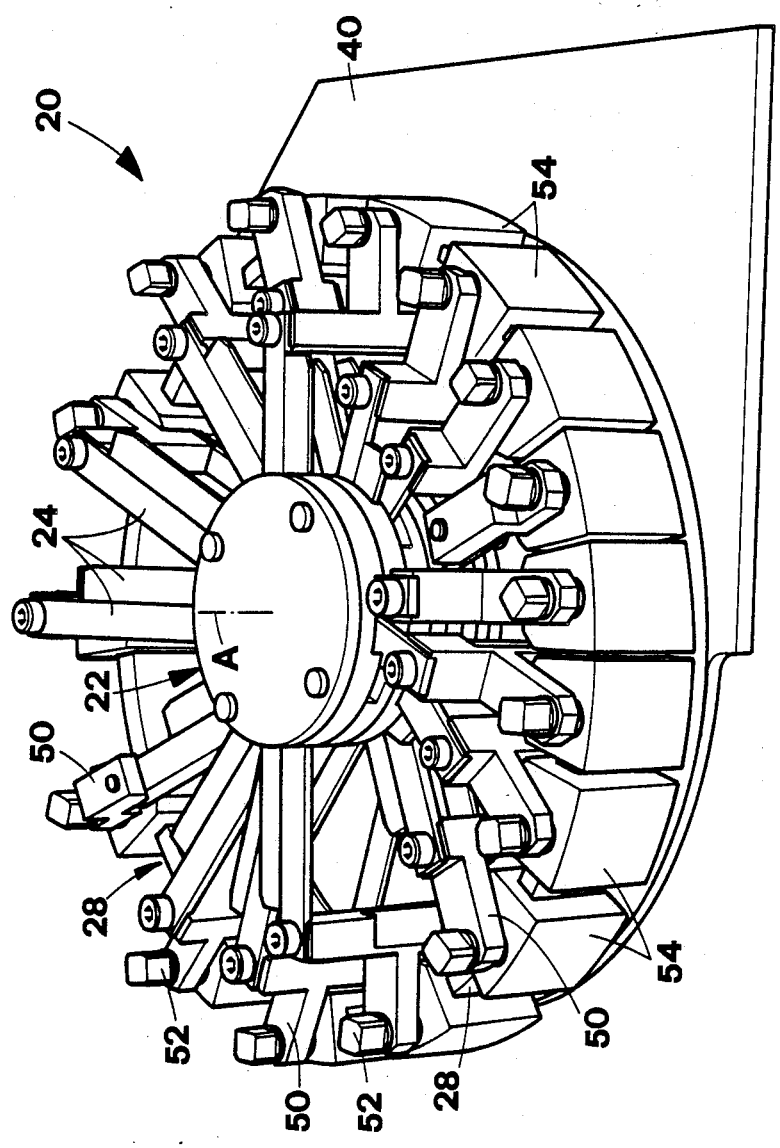
Figure 4:
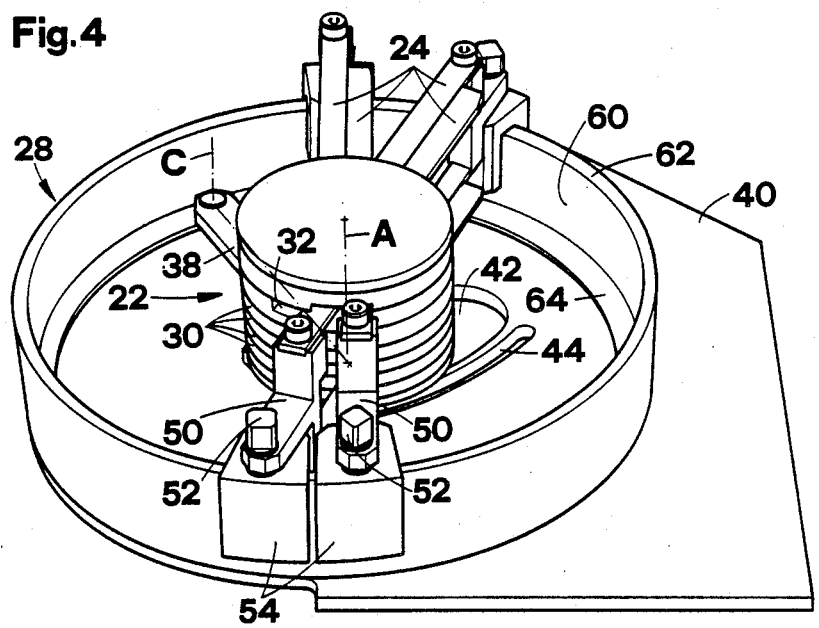
Figure 5:
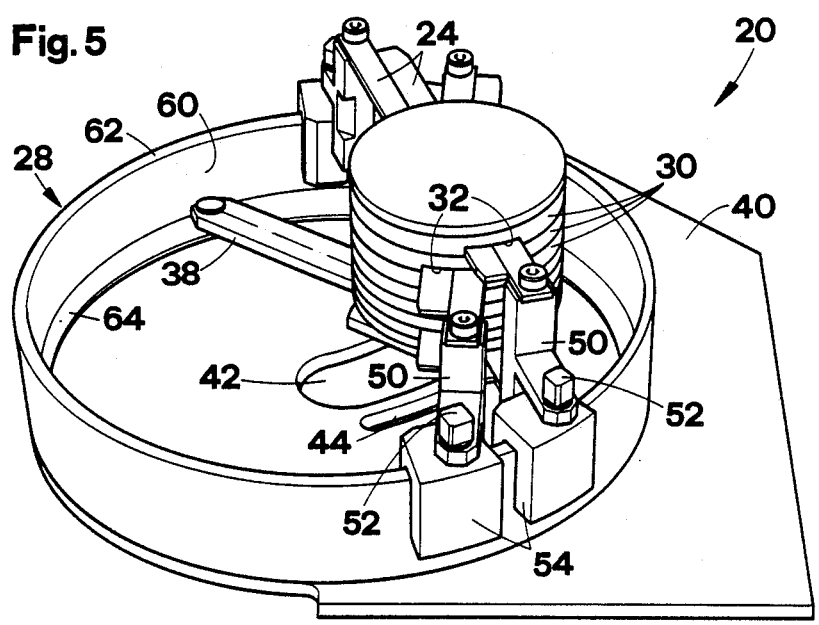
Figure 9:
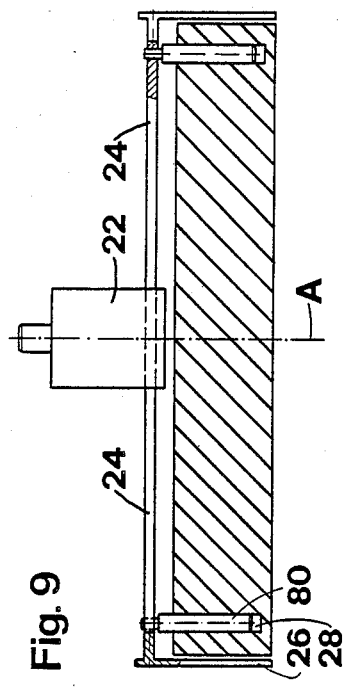
Figure 8:
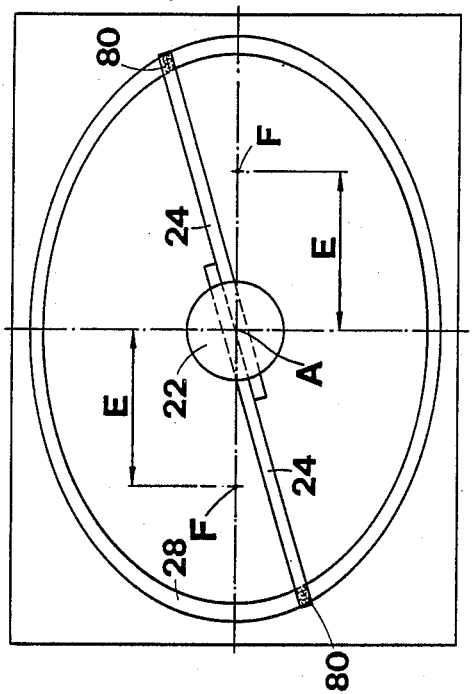
Figure 7:
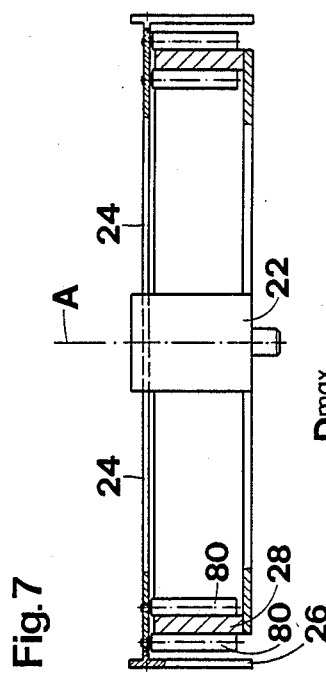
Figure 6:
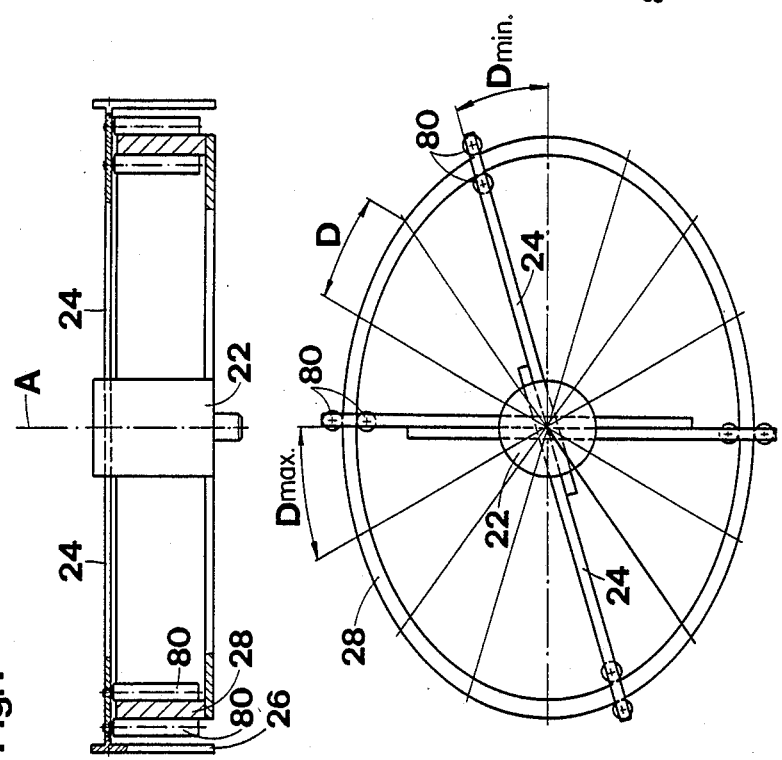

FIG. 1 shows a plan view of a first form of embodiment of an apparatus according to the invention, FIG. 2 shows the vertical section II—II in FIG. 1, FIG. 3 shows a view of the same apparatus obliquely from above, some parts of the apparatus being omitted, FIG. 4 shows an oblique view corresponding to FIG. 3 in which further parts are omitted in order to explain a first setting of the apparatus, FIG. 5 shows a corresponding oblique view of the apparatus in a second setting, FIG. 6 shows a plan view of a second form of embodiment of the apparatus according to the invention, FIG. 7 shows a vertical section through the apparatus according to FIG. 6, FIG. 8 shows a plan view of a third form of embodiment of an apparatus according to the invention, and FIG. 9 shows a vertical section through the apparatus according to FIG. 8.

According to FIGS. 1 to 5, articles 10, which are circular in cross-section, are being conveyed in a row without any gaps, between lateral boundaries 14 on a conveyor track 12. The articles 10 are glass bottles for example, which are to be washed or examined for cleanliness or filled. The articles 10 may, however, to mention only one further example, also be can bodies of sheet metal onto which a bottom and/or cover is to be beaded. Such operations or others are to be carried out after the articles 10 have been transferred to a rotary table 16 at the edge of which, recesses 18 are disposed at preset distances apart, each for one article 10. In order that an article 10 may be able to be pushed easily into each of the recesses 18, distances which coincide with the distances between each two successive recesses 18 must be provided between the articles 10 arriving on the conveyor track 12 and standing immediately one behind the other. This purpose is served by an apparatus 20 which is disposed between the conveyor track 12 and the rotary table 16 and is described below.

The apparatus 20 includes a hub 22 which can be driven in rotation about a vertical axis of rotation A. Numerous spokes 24 extend away from the hub 22 in radial directions and at uniform angular distances apart from one another. All spokes 24 are movable individually and independently of each other in longitudinal direction with respect to the hub 22. At one end of each spoke 24 there is disposed an entrainment means 26 or entrainer which is guided on a guide 28. In the example of embodiment shown in FIGS. 1 to 5, the guide 28 is a circular cylinder arranged round the hub 22 and having a vertical axis B.

The hub 22 is composed of discs 30 which are arranged coaxially one above the other and the number of which is half as great as the number of spokes 24. Each of the discs 30 has a diametral recess 32 in the form of a groove of rectangular cross-section. Guided in each of the recesses 32 are two spokes 24 the entrainment means 26 of which are arranged diametrically opposite one another with respect to the axis of rotation A. The discs 30 are held together axially by screws and according to FIG. 2 are rigidly connected to a vertical shaft 34 which is mounted on a guide bar 38 by means of a bearing arrangement 36 consisting of a plurality of ball bearings in the example illustrated.

The guide bar 38 is mounted on a horizontal base plate 40 for swivelling about a vertical swivel axis C. This base plate has a broad slot 42 and a narrower slot 44 both of which extend in the form of an arc about the swivel axis C and have a length which corresponds to a swivelling of the guide bar 38 through approximately 90°. The bearing arrangement 36 is adjustable in the slot 42. Guided in the slot 44 is an attachment screw 46 which can be tightened in such a manner that the hub 22 is secured to the base plate 40 in a selected position. During each revolution of the hub 22, the distance D between successive articles 10 varies from a minimum Dmin to a maximum Dmax and back to Dmin again. The difference between Dmax and Dmin depends on the eccentricity E of the axis of rotation A of the hub 22 in relation to the axis B of the guide 28.

The shaft 34 together wth the hub 22 can be driven in rotation in any desired manner; in the example illustrated it is provided that the shaft 34 is driven by a motor (not shown) via an intermediate shaft 48 which is mounted stationarily in relation to the base plate 40 and coaxially with the swivelling axis C.

Each of the entrainment means 26 is formed mainly of an angle member 50 secured to the associated spoke 24, a vertical pivot pin 52 and a rider 54 which is pivotally mounted on the associated angle member by means of the pivot pin and is seated astride the guide 28. Secured to each rider 54, radially inside the guide 28, is a sliding block 56 of plastic material with a low coefficient of friction and secured radially outside the guide 28 is a shaped member 58. In the example illustrated, the shaped members 58 are wedge-shaped in plan view and formed in such a manner that they can overlap one another in an imbricated manner as illustrated in FIG. 1 at the bottom right. The guide 28 has a smooth cylindrical inner surface 60 along which the slidng blocks 56 slide and which is bounded at the top by a flange 62 projecting radially inwards and at the bottom by a foot 64 secured to the base plate 40.

Arranged round the guide 28 is a frame 66 which is secured to the base plate 40 and which carries a cylindrical hood 68 as a protection against accidental contact with the entrainment means 26 which rotate rapidly in operation. The hood 68 leaves open a sector-shaped region in which there is disposed an arcuate member 70. The arcuate member 70 has the shape of an arc of a circle at its radially inner side and is curved coaxially with the guide 28, is at a radial distance from this which is adapted to the diameter of the articles 10, and extends from the end of the conveyor track 12 to the rotary table 16. In this manner, an arcuate path is preset for the articles 10 on which they pass from the conveyor track 12 to the rotary table 16 when the hub 22 turns in clockwise directrion, seen from above. The wedge shape of the entrainment members 58 enables the members of adjacent spokes to contact an article 10 at a leading point and a trailing point throughout the movement along the arcuate path. In the course of this, the distance D between successive articles 10 is determined by the distance between successive entrainment means 26.

As can be seen particularly from FIG. 1, successive entrainment means 26 have their shortest distance apart from one another at the place where the guide 28 is at its shortest distance from the axis of rotation A. The greatest distance between successive entrainment means 26 occurs at the diametrically opposite place where the guide 28 is at its greatest distance from the axis of rotation A. According to FIGS. 1 to 4, the axis of rotation A is adjusted so that the distance between successive articles 10 approximately doubles from the end of the conveyor track 12 to the transfer of the articles to the rotary table 16.

If articles 10 of a larger or smaller diameter are to be separated and/or if the increase in distance between successive articles 10 should be greater or less than illustrated, the attachment screw 46 is undone and the guide bar 38 swivelled in such a manner that the hub 22 is given an eccentricity E corresponding to the new conditions, in relation to the guide 28. A new setting with different eccentricity is shown in FIG. 5.

The modified forms of embodiment illustrated in FIGS. 6 and 7 on the one hand and in FIGS. 8 and 9 on the other hand differ from the one illustrated in FIGS. 1 to 5 primarily in that the guide 28 is not circular but elliptical. Thus the guide 28 itself has an eccentricity E which is defined as the distance of its centre from each of its foci F. The hub 22 is mounted in the centre of the guide 28 and thus eccentrically by the amount E in relation to each of the two foci F. The effect is also achieved by this means that the distance D between successive entrainment means varies periodically during each revolution of the hub 22. If the position and/or amplitude of this periodic variation has to be adapted to different articles 10 or different conveying tasks, the hub 22 can be displaced, for example along the major axis of the elliptical guide 28 or along a slot in the form of an arc of a circle as illustrated in FIGS. 1 to 5.

In the form of embodiment shown in FIGS. 6 and 7, the guide 28 extends upwards—and to this extent is comparable with FIGS. 1 to 5. In an end region of each of the spokes 24, a pair of vertical rollers 80 is mounted which rollers can roll on the inside and outside respectively of the guide 28.

As distinct from this, in the form of embodiment shown in FIGS. 8 and 9, only a single vertical roller is mounted on each spoke 24 and the guide 28 is constructed in the form of a groove in which the rollers 80 are guided.

Whereas in the three examples of embodiments shown, the guide 28 is made annular and surrounds the hub 22, a reverse formation is also possible for various applications, wherein the hub which can be driven in rotation is made annular, particularly in the form of a circular ring and surrounds the guide. In this case, the guide may be formed by a central cam which is circular for example but can be set eccentrically in relation to the annular hub and which does not move in operation. The spokes may comprise sliding or rolling shoes at their radially inner ends by means of which shoes they are supported on the outer circumferential surface of the cam-like guide. In this case, a spring may appropriately be disposed between the radially inner end of each spoke and the annular hub, which spring counteracts the centrifugal forces arising in operation and maintains the contact between the associated sliding or rolling shoe and the cam-like guide.

I claim:

1. An apparatus for altering the distances between articles moved one behind the other, particularly containers, comprising:

a hub which can be driven in rotation about an axis of rotation to move the articles along a path of movement from an entry point to a discharge point, a plurality of spokes which project away from the hub at specific angular spacings, entrainment means which are disposed one on each spoke, the two entrainment means on two adjacent spokes being adapted to contact one article at a leading point and a trailing point respectively throughout the movement of the article, and a guide for altering the radial distance of the entrainment means from the hub during its rotation.

2. An apparatus according to claim 1, characterized in that the guide comprises at least one portion which along its course varies its distance from the axis of rotation (A).

3. An apparatus according to claim 2, characterized in that the guide extends all round the hub.

4. An apparatus according to claim 3, characterized in that the guide is annular in shape and has an eccentricity (E) in relation to the hub.

5. An apparatus according to claim 4, characterized in that the hub and guide are mounted for eccentric adjustment relative to one another whereby the eccentricity is adjustable.

6. An apparatus according to claim 5, characterized in that the guide is stationarily mounted and the hub is mounted on a guide bar which in turn is mounted eccentrically in relation to the guide and can be locked.

7. An apparatus according to claim 1, characterized in that the spokes are guided for radial displacement in the hub.

8. An apparatus according to claim 7, characterized in that the hub comprises a diametral recess in each of a plurality of planes normal to the axis of rotation (A), in which recess two spokes projecting out of the hub oppositely to one another are guided jointly and against one another.

9. An apparatus according to claim 8, characterized in that the hub comprises a stack of coaxial discs in each of which there is formed a diametral recess.

10. An apparatus according to claim 1, characterized in that each entrainment means is mounted on the associated spoke for swivelling about a swivel axis parallel to the axis of rotation (A).

* * * * *